US008477010B2

(12) United States Patent
Cheron et al.

(10) Patent No.: US 8,477,010 B2
(45) Date of Patent: Jul. 2, 2013

(54) METHOD FOR COMMUNICATING INFORMATION BY INFRARED RAYS BETWEEN A TRANSMITTER AND A RECEIVER IN A HOME-AUTOMATION NETWORK

(75) Inventors: Eric Cheron, Taninges (FR);
Vyacheslav Baran, Poway, CA (US);
Herbert Rodas, Encinitas, CA (US);
Francis Valoteau, San Diego, CA (US)

(73) Assignee: Somfy SAS, Cluses (FR)

( * ) Notice: Subject to any disclaimer, the term of this patent is extended or adjusted under 35 U.S.C. 154(b) by 956 days.

(21) Appl. No.: 12/020,026

(22) Filed: Jan. 25, 2008

(65) Prior Publication Data
US 2009/0189776 A1 Jul. 30, 2009

(51) Int. Cl.
*B60R 25/00* (2006.01)

(52) U.S. Cl.
USPC .......................... 340/5.71; 340/5.72; 340/5.2

(58) Field of Classification Search
None
See application file for complete search history.

(56) References Cited

U.S. PATENT DOCUMENTS

| | | | | |
|---|---|---|---|---|
| 3,337,992 A | * | 8/1967 | Tolson | 49/29 |
| 5,049,867 A | * | 9/1991 | Stouffer | 340/426.17 |
| 5,442,341 A | * | 8/1995 | Lambropoulos | 340/5.26 |
| 5,640,160 A | | 6/1997 | Miwa | |
| 5,684,871 A | | 11/1997 | Devon et al. | |
| 5,818,183 A | * | 10/1998 | Lambert et al. | 318/286 |
| 5,825,007 A | * | 10/1998 | Jesadanont | 235/384 |
| 6,049,293 A | * | 4/2000 | Koot et al. | 340/12.29 |
| 6,144,177 A | * | 11/2000 | Mao | 318/466 |
| 7,106,209 B2 | * | 9/2006 | Mui | 340/4.3 |
| 2002/0140571 A1 | * | 10/2002 | Hayes et al. | 340/825.72 |
| 2003/0145956 A1 | | 8/2003 | Domel et al. | |
| 2006/0091998 A1 | * | 5/2006 | Fitzgibbon | 340/5.71 |
| 2006/0109078 A1 | * | 5/2006 | Keller et al. | 340/5.64 |

FOREIGN PATENT DOCUMENTS

| | | |
|---|---|---|
| EP | 1 333 706 A | 8/2003 |
| EP | 1 333 706 B | 2/2006 |
| WO | 03/030581 | 4/2003 |

OTHER PUBLICATIONS

Hodson, Local Area Networks, 2003, Thomson, 4th Edition, pp. 82 and 83.*

* cited by examiner

*Primary Examiner* — Mohammad Ghayour
*Assistant Examiner* — Brian Wilson
(74) *Attorney, Agent, or Firm* — Procopio, Cory, Hargreaves & Savitch LLP; Noel C. Gillespie

(57) ABSTRACT

Method for communicating information by infrared radiation between a control command transmitter for a motorized product for closure, privacy or solar protection in a building and a control command receiver, comprising the transmission of a communication frame including:

a preamble signal consisting of the repetition of pulses of a first type, and a data signal, the data being translated into the form of pulses of a second type, wherein the preamble signal and the data signal are modulated at the same frequency and wherein the data signal is separated from the preamble signal by a signal-free period having a duration of greater than twice the maximum duration separating two successive pulses of the second type.

18 Claims, 2 Drawing Sheets

METHOD FOR COMMUNICATING INFORMATION BY INFRARED RAYS BETWEEN A TRANSMITTER AND A RECEIVER IN A HOME-AUTOMATION NETWORK

BACKGROUND OF THE INVENTION

The invention relates to the field of the infrared remote control of motorized installations for products for solar protection and privacy in a building.

Said products are usually placed inside the building (residence, commercial building, etc.) and comprise an electromechanical actuator allowing their remote control by the user or their automatic control.

Remote controls are carried out by means of transmitters and receivers of infrared type (IR), by means of communication frames comprising in particular the code of the operations or commands to be executed, resulting in particular from the depressing of a key on a control keypad.

In earlier generations of products, mainly powered from the commercial AC network, the frames transmitted did not comprise any preamble, or else comprised a very simple preamble, of "start-bit" type identical to the other data signals, allowing in particular the fast synchronization of the IR receiver, the latter being permanently powered and therefore always listening out for any new signal.

DESCRIPTION OF THE PRIOR ART

This situation has evolved with the arrival of self-powered products, in particular powered by primary cells. Under these conditions, the IR receiver is mainly set in sleep mode and is activated only during brief time intervals to note whether a signal exists. Alternatively the receiver comprises two reception means: a first reception means with a very low consumption, being permanently powered, capable of discriminating a particular simple signal and of waking up a second reception means with a greater consumption, capable of demodulating a complex signal containing the data. Patent EP 1 333 706 describes such a device.

This type of "self-powered" receiver requires that the frame of the transmitter comprise a long preamble, for example a succession of 10 or 12 pulses exhibiting a frequency of 1 KHz and immediately preceding the data block. The data signals exhibit a different format according to whether a 0 bit or a 1 bit is involved, both nevertheless are transmitted in the form of pulses modulated at 38 KHz.

A first problem encountered is that this type of transmitter with long preamble and 1 KHz simple pulses cannot be understood by an earlier generation receiver.

A second problem encountered is that the frame transmitted by this type of transmitter with long preamble and 1 KHz simple pulses cannot be learnt and correctly resent by a so-called "universal" infrared remote control. Specifically, these remote controls comprise an IR reception stage and an IR transmission stage which usually consist of standard amplifying elements for demodulating signals of given frequency, in general 38 KHz. A preamble signal consisting of simple pulses at 1 KHz therefore cannot be learnt or resent by such a remote control.

If the preamble becomes modulated at 38 KHz itself, so as to be able to be learnt and retrieved by a universal remote control, compatibility with earlier generation receivers is however not completely ensured: indeed, there is a risk of erroneously interpreting signals of the preamble as data signals.

The last signals of the preamble, modulated at 38 KHz may indeed be interpreted wrongly as first data signals, even in the case where the formats of data signals and preamble signals are different.

Patent U.S. Pat. No. 5,640,160 describes such transmission formats. In this patent, the data are differentiated by a position-modulation procedure: each pulse exhibits the same duration t and is followed by a quiescent state of duration t, or 2t, or 3t according to whether the transmission of a 0 state, a 1 state or a preamble is involved.

In this patent however, the preamble comprises a single pulse (modulated at 38 KHz as are the data pulses). This type of preamble is therefore not adequate for allowing a self-powered receiver to be woken up.

SUMMARY OF THE INVENTION

The aim of the invention is to provide a communication method based on infrared rays remedying these drawbacks and improving the communication methods known from the prior art. In particular, the invention allows downward compatibility between the new remote controls of the new (self-powered) receivers and the earlier (externally-powered) receivers. In particular, the method makes it possible to prevent pulses of a preamble signal from being interpreted as data. It furthermore makes it possible to prevent the first data of a data signal from not being received by the receiver.

According to the invention, the method makes it possible to communicate information by infrared radiation between a control command transmitter for a motorized product for closure, privacy or solar protection in a building and a control command receiver. It comprises the transmission of a communication frame including:

a preamble signal consisting of the repetition of pulses of a first type, and
a data signal, the data being translated into the form of pulses of a second type.

It is such that the preamble signal and the data signal are modulated at the same frequency and such that the data signal is separated from the preamble signal by a signal-free period which duration is greater than twice the maximum duration separating two successive pulses of the second type.

The signal-free period may have a duration greater than 2.4 times the maximum duration separating two pulses of the second type.

The control command receiver may include a first circuit for reception, processing the preamble signal and waking up, upon reception of a preamble signal, a second circuit for receiving and processing the data signal and the signal-free period may have, furthermore, a duration of greater than twice the duration of processing of the preamble signal up to the waking of the second circuit.

The signal-free period may have a duration greater than 2.4 times the duration of processing of the preamble signal up to the waking of the second circuit.

According to the invention, the control command transmitter for a motorized product for closure, privacy or solar protection in a building is such that it comprises hardware means and software for implementing the communication method defined previously.

According to the invention, the home-automation installation comprises a control command transmitter defined previously and at least one control command receiver.

At least one control command receiver may be associated with a motorized and self-powered home-automation product.

The home-automation installation may also comprise at least one externally-powered motorized home-automation product, associated with a simple-infrared-control command receiver, normally controlled by a preamble-free communication frame, the externally-powered motorized home-automation product being also controllable by the control command transmitter.

The home-automation installation may comprise a universal remote control comprising a means for learning a communication frame transmitted by the control command transmitter and a means for transmitting infrared rays making it possible to resend a signal comprising this communication frame.

DESCRIPTION OF THE DRAWINGS

The appended drawing represents, by way of example, an embodiment of an installation using a communication method according to the invention and an example of a frame of a communication signal used in such a communication method.

DESCRIPTION OF THE PREFERRED EMBODIMENT(S)

Figure 1:
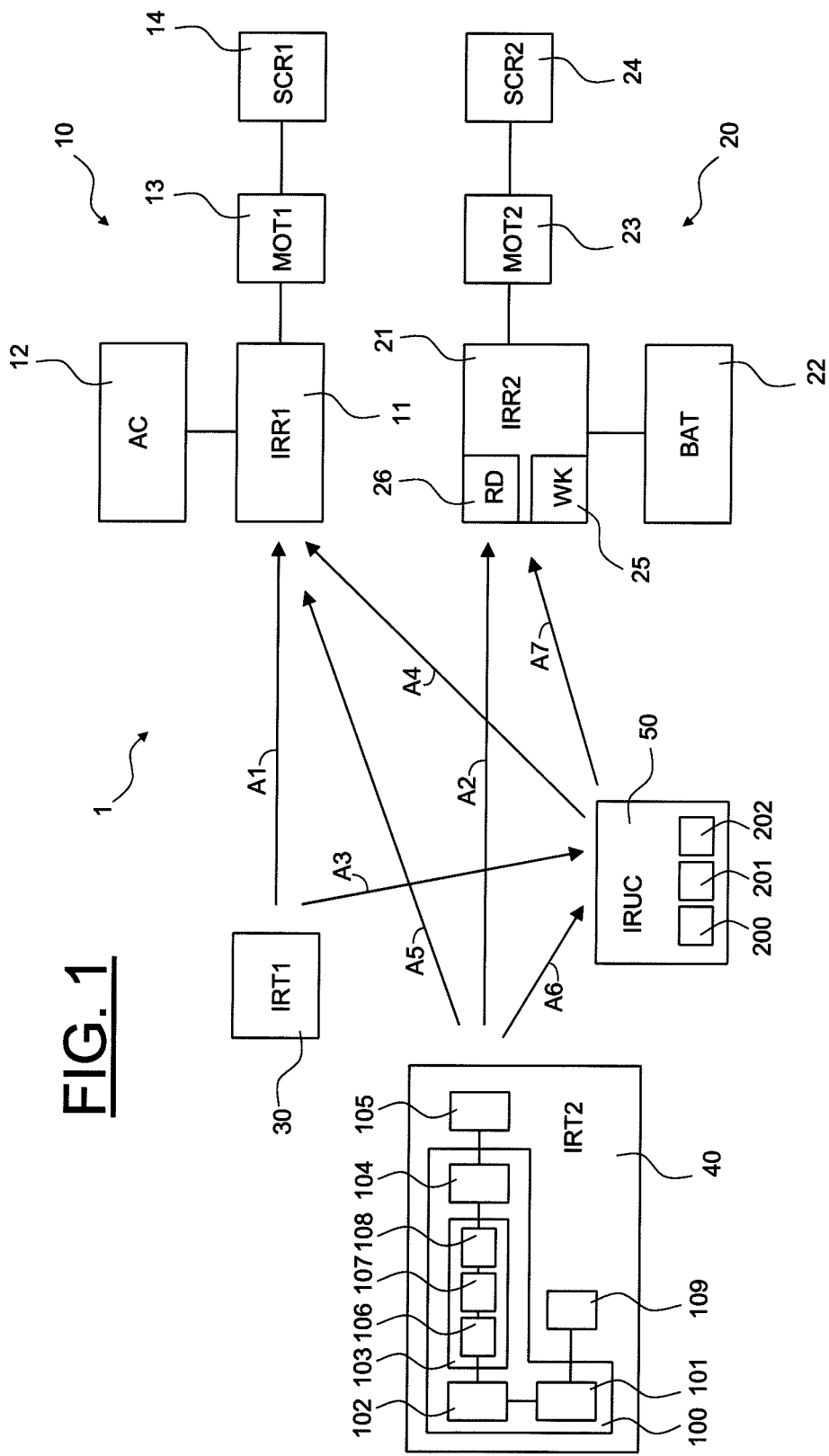
FIG. 1 is a diagram of an embodiment of an installation according to the invention.

The installation 1 comprises a first motorized window coverage product 10, comprising a first simple infrared receiver 11 (also referenced IRR1), a first power supply block 12 (also referenced AC) wired up to the AC mains linked to the receiver, a first electric motor 13 (also referenced MOT1) powered by the receiver and mechanically driving a first window screen 14 (also referenced SCR1) such as a Venetian blind.

The simple receiver IRR1 is of permanently powered type, and therefore does not require any repetitive preamble to effect wakeup. It comprises a circuit for amplifying and demodulating 38 KHz signals.

The installation also comprises a second motorized window coverage product 20, comprising a second double infrared receiver 21 (also referenced IRR2), a second power supply block 22 (also referenced BAT) wired up this time to a primary battery and linked to the receiver, a second electric motor 23 (also referenced MOT2) powered by the receiver and mechanically driving a second window screen 24 (also referenced SCR2) such as a Venetian blind.

The double receiver IRR2 is of self-powered type, requiring that the communication frames comprise a repetitive preamble to effect wakeup. It comprises a first circuit 25 for receiving and recognizing 1 KHz pulses (or wakeup circuit, referenced WK) and a second circuit 26, referenced RD, for receiving, amplifying and demodulating 38 KHz signals, this circuit being placed in sleep mode and woken up by the first circuit WK when one or more 1 KHz pulses are detected.

The installation also comprises a first infrared transmitter 30 (also referenced IRT1) capable of transmitting a frame of position-modulated data, as described in the prior art, this frame possibly comprising a short preamble formed by one or two preamble pulses. All the pulses are modulated at the frequency of 38 KHz.

Thus, the direct control of the first receiver IRR1 by the first transmitter IRT1 is possible, as represented by the arrow A1.

The installation also comprises a second infrared transmitter 40 (also referenced IRT2) capable of transmitting a frame of position-modulated data, just as for the first transmitter, this frame comprising a long periodic preamble formed by about ten preamble pulses. The preamble pulses have a repetition frequency of 1 KHz.

Thus, the direct control of the double receiver IRR2 by the second transmitter IRT2 is possible, as represented by the arrow A2, since the long periodic preamble is detected by the wakeup circuit.

All these preamble pulses are modulated at the frequency of 38 KHz, so as to also allow learning and repetition by a universal remote control as will be seen further on.

The second infrared transmitter comprises means allowing it to operate in accordance with the communication method which is the subject of the invention. Thus, it comprises means 101 for defining a control command or an order to be transmitted by an infrared signal, means 102 for translating this control command or this order into a code, means 103 for, on the basis of this code, determining the frame of the signal to be transmitted, means 104 for modulating the signal and means 105 for transmitting the infrared signal. In particular, the means for determining the frame of the signal to be transmitted on the basis of the code comprise means 106 for defining the frame of a preamble signal consisting of the repetition of pulses, means 107 for defining the frame of a data signal and means 108 for inserting a signal-free period of a determined duration between these two frames.

All the means mentioned in the previous paragraph with the exception of the transmission means may be grouped together in a logic processing unit 100 of the second transmitter. These means can consist of software means, such as computer programs. A man-machine interface 109 comprising a control keypad and/or display means is linked to the logic processing unit.

The installation also comprises a universal remote control 50 (also referenced IRUC) provided with known means of IR reception 200, storage 201 and IR transmission 202. Traditionally, this universal remote control is capable of recording frames of all types, provided that the signals included in these frames are modulated at 38 KHz. Therefore, the universal remote control can receive and resend signals provided by the first transmitter and intended to control the first receiver (arrows A3 and A4).

The transmitters and the universal remote control contain control keys (not represented).

The preamble pulses of a signal from the second transmitter being modulated at the frequency of 38 KHz, the universal remote control can also receive and retrieve signals from the second transmitter (arrows A6 and A7).

On account of the invention and of the frame format described below, the second transmitter IRT2 can also control the first receiver IRR1, thereby ensuring downward compatibility between equipment, since the second transmitter and receiver, the latter being self-powered, are of more recent type than the first transmitter and receiver, the latter being powered from the mains. This possibility is represented by the arrow A5. Only an earlier transmitter (IRT1) intended for a externally-powered system cannot control a new receiver (IRR2).

Figure 2:
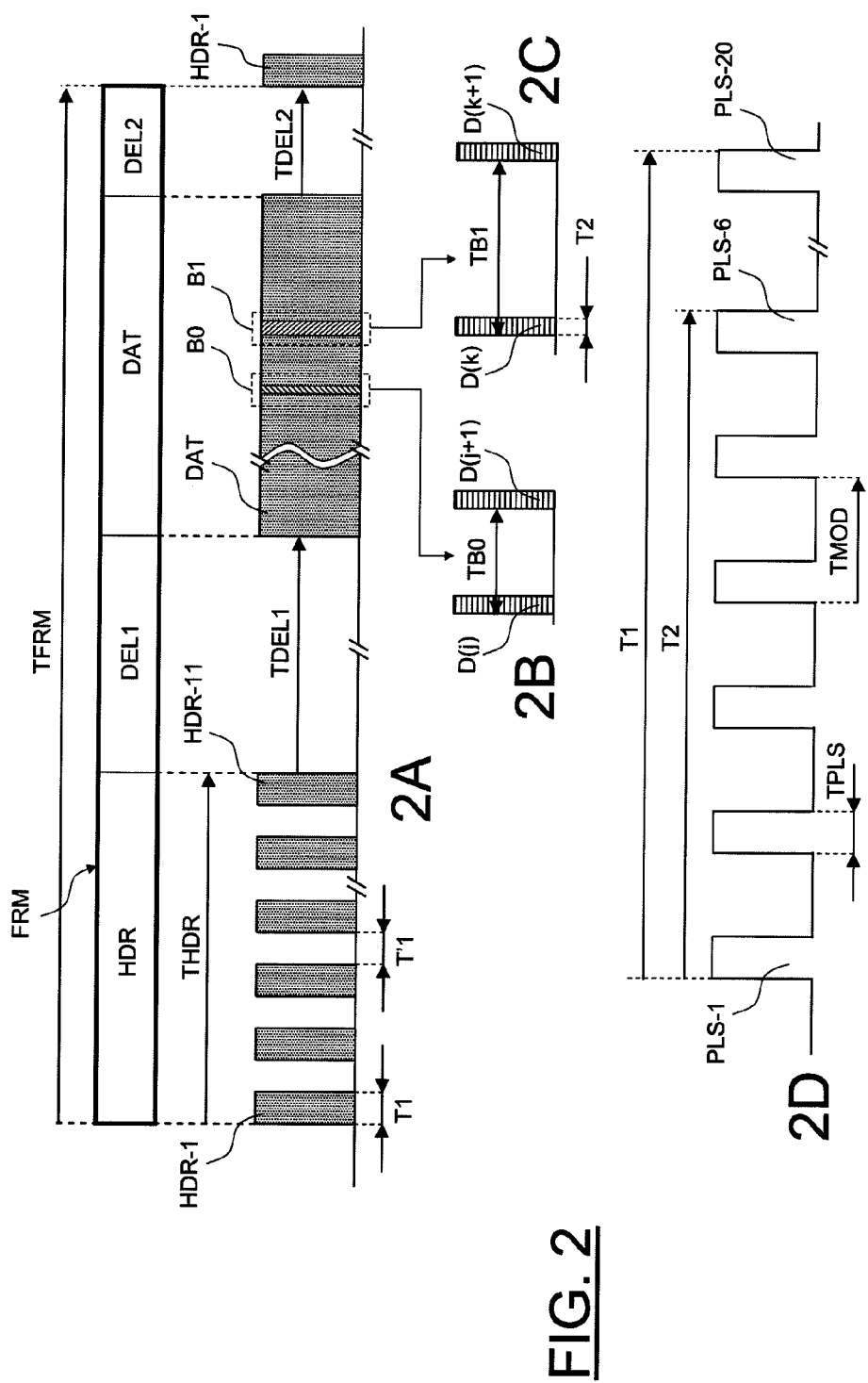
FIG. 2 is a diagram representing an exemplary structure of the frame of a communication signal used in a mode of execution of the communication method according to the invention.

FIG. 2 describes the frame format transmitted by the second transmitter IRT2 and understood by the second receiver IRR2.

A first part 2A of FIG. 2 describes the whole frame FRM, up to the appearance of the start of the following frame.

The frame FRM comprises 4 elements:

a long and periodic preamble HDR (Header), a first silence or lag DEL1 of long and fixed duration called signal free period, a data set DAT of variable length, a second silence or lag DEL2 of variable duration.

The frame FRM has a duration TFRM, preferably equal to 121 ms±5%. When a key of a control keypad of the transmitter IRT2 is pressed, the same frame is repeated so long as the key is activated and the data set DAT comprises at least one binary message including the identity of the transmitter IRT2, or alternatively a group code, and the code of the activated key, or alternatively the code of a command to be executed resulting from the depression of the key or the depression of a combination of keys.

The preamble HDR is of long and periodic type, consisting preferably of 11 identical pulses, called pulses of first type and referenced HDR-1 to HDR-11, the whole set having a duration THDR preferably equal to 10.5 ms±5%. This total duration results from the particular format of each pulse of first type, the duration T1 of a pulse of first type being 0.5 ms, followed by an identical duration T'1 thereby giving a period of 1 ms (i.e. a frequency of 1 KHz) for the preamble signal.

The data set DAT comprises a succession of bits B0 in the 0 state and bits B1 in the 1 state, the differentiation between bits taking place by position modulation as described in the prior art. The position modulation takes place between pulses of second type. These pulses of second type have a common duration T2, preferably equal to 140 µs±5%.

A bit B0 has been represented for example in part 2B of FIG. 2. A first pulse of second type D(j) is separated from a following pulse D(j+1) by a duration TB0 representative of a bit B0. Preferably, this duration is equal to 5 ms (including the duration T2 of a pulse).

A bit B1 has been represented for example in part 2C of FIG. 2. A third pulse of second type D(k) is separated from a following pulse D(k+1) by a duration TB1 representative of a bit B1. Preferably, this duration is equal to 7.5 ms (including the duration T2 of a pulse).

Contrary to what is described in patent EP 1 333 706, the pulses of first type and also the pulses of second type are modulated at the same frequency FMOD, as represented in part 2D of FIG. 2.

The modulation period TMOD is preferably equal to 26.3 µs±5%, thereby corresponding to a frequency FMOD equal to 38 KHz for which there exist standard components for carrier amplification and demodulation (also comprising position demodulation), for example the circuit referenced TSOP2138.

The discrimination between pulses of the first type and pulses of the second type could therefore be done solely by compared analysis of the durations T1 and T2, but this would assume complex logic while the wakeup circuit WK must have a structure as simple as possible so as to minimize its consumption.

In the simplest case, the data reception circuit RD can be woken up through the detection and verification of a single preamble period (T1+T'1). If this is for example the penultimate preamble period (HDR-10), then the last preamble period can be interpreted as being a first data bit. Specifically, the total processing time T3 for the preamble pulses for waking up the second circuit RD can be such that this circuit becomes active during the last pulse HDR-11 and that the latter exhibits an apparent duration of around the common duration T2: the last preamble pulse is then mistaken for being a pulse of second type. The same situation will prevail if the preamble pulse detected as having the right format is a previous pulse (for example HDR-9) but with a bigger total time T3.

To avoid such a situation with a sufficient safety margin and in accordance with the invention, the preamble is followed by a first lag DEL1, silence without transmission, whose duration TDEL1 is greater than twice the larger value:

- of the total duration T3 of processing of the preamble and wakeup pulses for the second circuit RD charged with receiving, amplifying and processing the data of the data set DAT,
- of the nominal duration TB1 corresponding to the longest position modulation in the data set DAT, that is to say the duration separating two start of successive pulses D(k), D(k+1).

Preferably, the duration TDEL1 of the first lag is equal to 18 ms±5%, i.e. a ratio TDEL1/TB1 of very substantially greater than 2 (equal to 2.4, i.e. a complementary margin of 20%).

Although lengthening the total duration of a frame, this choice guarantees that a long periodic preamble will be correctly interpreted without interference between preamble and data set.

With such a frame format, a second transmitter can not only control a second receiver but also a first receiver. Moreover, the second transmitter can be used to allow a universal remote control to learn to control a second receiver or else a first receiver.

The invention claimed is:

1. A method for communicating information by infrared radiation between a control command transmitter for a motorized product for closure, privacy or solar protection in a building and a control command receiver, the method comprising the transmission of a series of communication frames, wherein each frame in the series includes:
    a preamble signal comprising one or more pulses of a first type, the pulses of the first type having a first duration; and
    a data signal, the data being translated into the form of pulses of a second type, the pulses of the second type having a second duration which is different than the first duration;
    wherein the preamble signal and the data signal are modulated at the same frequency,
    wherein the control command receiver includes a first circuit for reception, processing the preamble signal, and waking up, upon reception of a preamble signal, a second circuit for receiving and processing the data signal, and
    wherein the data signal is separated from the preamble signal by a signal-free period which has a duration that is greater than twice the maximum duration separating two successive pulses of the second type and greater than twice the duration of processing of the preamble signal up to the waking of the second circuit.

2. The communication method as claimed in claim 1, wherein the signal-free period has a duration greater than 2.4 times the maximum duration separating two pulses of the second type.

3. The communication method as claimed in claim 1, wherein the signal-free period has a duration of greater than 2.4 times the duration of processing of the preamble signal up to the waking of the second circuit.

4. A control command transmitter for a motorized product for closure, privacy or solar protection in a building, which comprises hardware means and software for implementing the communication method as claimed in claim 1.

5. A home-automation installation comprising a control command transmitter as claimed in claim 4 and at least one control command receiver.

6. The home-automation installation as claimed in claim 5, wherein at least one control command receiver is associated with a motorized and self-powered home-automation product.

7. The home-automation installation as claimed in claim 5, which also comprises at least one externally-powered motorized home-automation product, associated with a simple-infrared-control command receiver, normally controlled by a preamblefree communication frame, the externally-powered motorized home-automation product being also controllable by the control command transmitter.

8. The home-automation installation as claimed in claim 5, which comprises a universal remote control comprising a means for learning a communication frame transmitted by the control command transmitter and a means for transmitting infrared rays making it possible to retrieve a signal comprising this communication frame.

9. The home-automation installation of claim 5, wherein the preamble signal consists of one or two pulses of the first type.

10. The home-automation installation of claim 5, wherein the preamble signal comprises ten or more pulses of the first type.

11. The method of claim 1, wherein the pulses of the first type are configured to be received by both a first receiver configured to receive signals transmitted at a first frequency and a second receiver configured to receive signals transmitted at a second frequency, wherein the first frequency and the second frequency are different.

12. The method of claim 11, wherein the first frequency is 1 khz and the second frequency is 38 khz.

13. The method of claim 1, wherein the preamble signal consists of one or two pulses of the first type.

14. The method of claim 1, wherein the preamble signal comprises ten or more pulses of the first type.

15. A method for communicating information by infrared radiation between a control command transmitter for a motorized product for closure, privacy or solar protection in a building and a control command receiver, the method comprising the transmission of a series of communication frames, wherein each frame in the series includes:
  a preamble signal comprising one or more pulses of a first type, the pulses of the first type having a first duration; and
  a data signal, the data being translated into the form of pulses of a second type, the pulses of the second type having a second duration which is different than the first duration;
  wherein the preamble signal and the data signal are modulated at the same frequency,
  wherein the control command receiver includes a first circuit for reception, processing the preamble signal, and waking up, upon reception of a preamble signal, a second circuit for receiving and processing the data signal,
  wherein the data signal is separated from the preamble signal by a signal-free period which has a duration that is greater than twice the maximum duration separating two successive pulses of the second type and greater than twice the duration of processing of the preamble signal up to the waking of the second circuit, and
  wherein each communication frame sent by the transmitter is adapted to control a first type of receiver and a second type of receiver, the first type of receiver configured to receive signals at a first frequency, the second type of receiver configured to receive signals at a second frequency.

16. The method of claim 15, wherein one or more of said communication frames are adapted to program a remote controller configured to receive signals at the second frequency.

17. The method of claim 15, wherein the first frequency is 1 khz.

18. The method of claim 15, wherein the second frequency is 38 khz.

* * * * *